(12) United States Patent
Zhang et al.

(10) Patent No.: US 9,131,217 B2
(45) Date of Patent: Sep. 8, 2015

(54) REFERENCE PICTURE LIST MODIFICATION FOR VIEW SYNTHESIS REFERENCE PICTURES

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 13/705,853

(22) Filed: Dec. 5, 2012

(65) Prior Publication Data

US 2013/0148722 A1 Jun. 13, 2013

Related U.S. Application Data

(60) Provisional application No. 61/569,137, filed on Dec. 9, 2011.

(51) Int. Cl.
| | |
|---|---|
| H04N 7/12 | (2006.01) |
| H04N 11/02 | (2006.01) |
| H04N 11/04 | (2006.01) |
| H04N 19/50 | (2014.01) |
| H04N 19/597 | (2014.01) |
| H04N 19/70 | (2014.01) |

(52) U.S. Cl.
CPC ......... *H04N 19/00569* (2013.01); *H04N 19/50* (2014.11); *H04N 19/597* (2014.11); *H04N 19/70* (2014.11)

(58) Field of Classification Search
USPC .................................................. 375/240.12
See application file for complete search history.

(56) References Cited

U.S. PATENT DOCUMENTS

| | | | |
|---|---|---|---|
| 2009/0296811 A1* | 12/2009 | Jeon et al. ................ | 375/240.12 |
| 2010/0091845 A1* | 4/2010 | Jeon et al. ................ | 375/240.12 |
| 2010/0189173 A1 | 7/2010 | Chen et al. | |

(Continued)

FOREIGN PATENT DOCUMENTS

WO 2009130561 A1 10/2009

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

(Continued)

*Primary Examiner* — Hee-Yong Kim
(74) *Attorney, Agent, or Firm* — Shumaker & Sieffert, P.A.

(57) ABSTRACT

A video encoder generates a bitstream that includes a reference picture list modification (RPLM) command. The RPLM command belongs to a type of RPLM commands for inserting short-term reference pictures into reference picture lists. The RPLM command instructs a video decoder to insert a synthetic reference picture into the reference picture list. The video decoder decodes, based at least in part on syntax elements parsed from the bitstream, one or more view components and generates, based at least in part on the one or more view components, the synthetic reference picture. The video decoder modifies, in response to the RPLM commands, a reference picture list to include the synthetic reference picture. The video decoder may use one or more pictures in the reference picture list as reference pictures to perform inter prediction on one or more video blocks of a picture.

38 Claims, 6 Drawing Sheets

(56) References Cited

U.S. PATENT DOCUMENTS

2011/0243224 A1 10/2011 Su et al.
2012/0062756 A1 3/2012 Tian et al.
2012/0147137 A1 6/2012 Jeon et al.

OTHER PUBLICATIONS

Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "High efficiency video coding (HEVC) text specification draft 9," Joint Collaborative Team on Video Coding, JCTVC-K1003_v7, Oct. 10-19, 2012, 290 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
International Search Report and Written Opinion—PCT/US2012/068230—ISA/EPO—Jan. 21, 2013—10 pp.
International Telecommunication Union, "Advanced video coding for generic audiovisual services," Standardization Sector of ITU, Jun. 2011, 674 pp.
Rusanovskyy et al., "Suggestion for a depth-enhanced multiview video coding extension to H.264 Annex A: Nokia 3DV Test Model (3DV-TM) Codec Description and Simulation Results", ITU Telecommunications Standardization, Feb. 3-10, 2012, Document VCEG-AR14, 14 pp.
Sullivan et al., "Editors' draft revision to ITU-T Rec. H.264 ISO |IEC 14496-10 Advanced Video Coding—in preparation for ITU-T SG 16 AAP Consent (in integrated form)," Joint Video Team (JVT) of ISO/IEC MPEG & ITU-T VCEG, JVT-AD007.doc, Jan. 29-Feb. 3, 2009, 683 pp.
Tian et al., "Mitsubishi Response to MPEG Call for Proposal on 3D Video Coding Technology", International Organisation for Standardisation, MPEG2011/M22663, Nov. 2011, 18 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011, 193 pp.
Wiegand et al.,"WD1: Working Draft 1 of High-Efficiency Video Coding", Joint Collaborative Team on Video Coding, JCTVC-C403, Oct. 7-15, 2010, 137 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Response to Written Opinion dated Jan. 21, 2013 from International Application No. PCT/US2012/068230, filed on Jul. 1, 2013, 28 pp.
Second Written Opinion from International Application No. PCT/US2012/068230, dated Nov. 20, 2013, 6 pp.
Response to Second Written Opinion dated Nov. 20, 2013 from International Application No. PCT/US2012/068230, filed on Dec. 6, 2012, 23 pp.
International Preliminary Report on Patentability—PCT/US2012/068230, The International Bureau of WIPO—Geneva, Switzerland, Mar. 24, 2014, 7 pp.

* cited by examiner

REFERENCE PICTURE LIST MODIFICATION FOR VIEW SYNTHESIS REFERENCE PICTURES

This application claims the benefit of U.S. Provisional Patent Application No. 61/569,137, filed Dec. 9, 2011, the entire content of which is hereby incorporated by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

A video encoder generates a reference picture list modification (RPLM) command that belongs to a type of RPLM commands for inserting short-term reference pictures into reference picture lists. A video decoder modifies, in response to the RPLM command, a reference picture list to include a synthetic reference picture. The video decoder uses one or more pictures in the reference picture list to perform inter prediction on one or more video blocks of a picture.

In one aspect, a method for multiview video decoding comprises decoding, based at least in part on syntax elements parsed from a bitstream, one or more view components. The method also comprises generating, based at least in part on the one or more view components, a synthetic reference picture. In addition, the method comprises inserting, in response to a RPLM command, the synthetic reference picture at a particular location within a reference picture list. The RPLM command belongs to a type of RPLM commands for inserting short-term reference pictures into reference picture lists. In addition, the method comprises using one or more pictures in the reference picture list to perform inter prediction on video blocks of a current picture.

In another aspect, a video decoding device comprises one or more processors configured to decode, based at least in part on syntax elements parsed from a bitstream, one or more view components. The one or more processors are also configured to generate, based at least in part on the one or more view components, a synthetic reference picture. In addition, the one or more processors are configured to insert, in response to a RPLM command, the synthetic reference picture at a particular location within a reference picture list. The RPLM command belongs to a type of RPLM commands for inserting short-term reference pictures into reference picture lists. Furthermore, the one or more processors are configured to use one or more pictures in the reference picture list to perform inter prediction on video blocks of a current picture.

In another aspect, a video decoding device comprises means for decoding, based at least in part on syntax elements parsed from a bitstream, one or more view components. The video decoding device also comprises means for generating, based at least in part on the one or more view components, a synthetic reference picture. Furthermore, the video decoding device comprises means for inserting, in response to a RPLM command, the synthetic reference picture at a particular location within a reference picture list. The RPLM command belongs to a type of RPLM commands for inserting short-term reference pictures into reference picture lists. The video decoding device also comprises means for using one or more pictures in the reference picture list to perform inter prediction on video blocks of a current picture.

In another aspect, a computer-readable storage medium has stored thereon instructions that, when executed by one or more processors of a video decoding device, cause the video decoding device to decode, based at least in part on syntax elements parsed from a bitstream, one or more view components. The instructions also configure the video decoding device to generate, based at least in part on the one or more view components, a synthetic reference picture. Furthermore, the instructions configure the video decoding device to insert, in response to a RPLM command, the synthetic reference picture at a particular location within a reference picture list. The RPLM command belongs to a type of RPLM commands for inserting short-term reference pictures into reference picture lists. The instructions also configure the video decoding device to use one or more pictures in the reference picture list to perform inter prediction on video blocks of a current picture.

In another aspect, a method for multiview video encoding comprises generating, based at least in part on one or more view components, a synthetic reference picture. The method also comprises using the synthetic reference picture as a reference picture to encode one or more video blocks of a current picture. In addition, the method comprises generating a bitstream that includes a RPLM command that belongs to a type of RPLM commands for inserting short-term reference pictures into reference picture lists. The RPLM command instructs a video decoder to insert the synthetic reference picture at a particular location in a reference picture list.

In another aspect, a video encoding device comprising one or more processors configured to generate, based at least in part on one or more view components, a synthetic reference picture. The one or more processors are also configured to use the synthetic reference picture as a reference picture to encode one or more video blocks of a current picture. In addition, the one or more processors are configured to generate a bitstream that includes a RPLM command that belongs to a type of RPLM commands for inserting short-term reference pictures into reference picture lists, the RPLM command instructing a video decoder to insert the synthetic reference picture at a particular location in a reference picture list.

In another aspect, a video encoding device comprises means for generating, based at least in part on one or more view components, a synthetic reference picture. Furthermore, the video encoding device comprises means for using the synthetic reference picture as a reference picture to encode one or more video blocks of a current picture. In addition, the video encoding device comprises means for generating a bitstream that includes a RPLM command that belongs to a type of RPLM commands for inserting short-term reference pictures into reference picture lists, the RPLM command instructing a video decoder to insert the synthetic reference picture at a particular location in a reference picture list.

In another aspect, a computer-readable storage medium has stored thereon instructions that, when executed by one or more processors of a video encoding device, configure the video encoding device to generate, based at least in part on one or more view components, a synthetic reference picture. The instructions also configure the video decoding device to use the synthetic reference picture as a reference picture to encode one or more video blocks of a current picture. Furthermore, the instructions configure the video decoding device to generate a bitstream that includes a RPLM command that belongs to a type of RPLM commands for inserting short-term reference pictures into reference picture lists, the RPLM command instructing a video decoder to insert the synthetic reference picture at a particular location in a reference picture list.

The details of one or more examples of the disclosure are set forth in the accompanying drawings and the description below. Other features, objects, and advantages will be apparent from the description, drawings, and claims.

DETAILED DESCRIPTION

Conventionally, video encoders may be unable to use reference picture list modification (RPLM) commands for short-term reference pictures to insert synthetized reference pictures, such as view synthesis reference pictures (VSRPs) at arbitrary positions in reference picture lists. An RPLM command may be a set of one or more syntax elements for inserting a reference picture in a reference picture list. This inability may lead to a decrease in coding efficiency and may potentially decrease error resiliency.

The techniques of this disclosure may remedy this problem. As described in this disclosure, a video encoder may generate one or more RPLM commands for short-term reference pictures. The RPLM commands for short-term reference pictures may be RPLM commands that belong to a type of RPLM commands for inserting short-term reference pictures into reference picture lists. A video decoder may modify, in response to the one or more reference RPLM commands for short-term reference pictures, a reference picture list to include a VSRP. The video decoder may use one or more reference pictures in the reference picture list to perform inter prediction on one or more video blocks of a picture.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
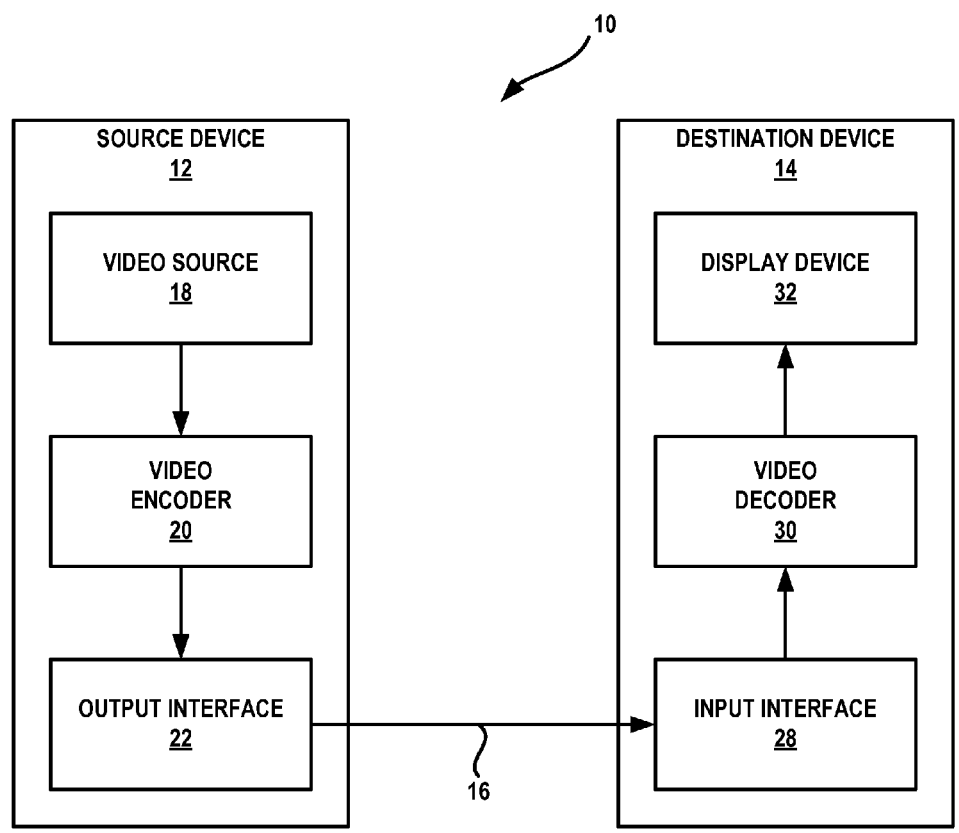
FIG. 1 is a block diagram illustrating an example video coding system that may utilize the techniques described in this disclosure.

FIG. 1 is a block diagram illustrating an example video coding system 10 that may utilize the techniques of this disclosure. As used described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. A draft of the MVC extension of H.264 is, as of Nov. 7, 2012, available for download at http://http://wftp3.itu.int/av-arch/jvt-site/2009_01_Geneva/JVT-AD007.zip, the entire content of which is hereby incorporated by reference. In other examples, video encoder 20 and video decoder 30 may operate according to other video compression standards, including the High Efficiency Video Coding (HEVC) standard presently under development. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Nov. 7, 2012, is downloadable from: http://phenix.int-evry.fr/jct/doc_end_user/documents/11_Shanghai/wg11/JCTVC-K1003-v8.zip, the entire content of which is incorporated herein by reference. The techniques of this disclosure, however, are not limited to any particular coding standard or technique.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. In H.264, a video block may correspond to a macroblock or a partition of a macroblock in H.264. In HEVC, a video block may correspond to a coding unit (CU). Video blocks may have fixed or varying sizes, and may differ in size according to a specified coding standard. Furthermore, each video frame may include a plurality of slices. Each slice may include a plurality of video blocks.

When video encoder 20 encodes a video block, video encoder 20 may generate a predictive pixel block that corresponds to the video block. Video encoder 20 may perform intra prediction or inter prediction to generate the predictive pixel block. When video encoder 20 performs intra prediction on a video block, video encoder 20 may generate, based on samples (e.g., values of pixel components) within the same video frame as the video block, a predictive pixel block that corresponds to the video block. When video encoder 20 performs inter prediction to generate a predictive pixel block that corresponds to a video block, video encoder 20 may generate the predictive pixel block based on samples within one or more reference pictures. The reference pictures may be pictures other than the picture that contains the video block.

After video encoder 20 generates a predictive pixel block that corresponds to a video block, video encoder 20 may generate a residual video block that corresponds to the video block. Each sample in the residual video block may be based on a difference between corresponding samples in the video block and the predictive pixel block. Video encoder 20 may apply a transform to the residual video block to generate one or more coefficient blocks. Video encoder 20 may apply various transforms to the residual video block. For example, video encoder 20 may apply a transform such as a discrete cosine transform (DCT), an integer transform, a wavelet transform, or a conceptually-similar transform to the residual video block. Video encoder 20 may quantize the coefficient block to further reduce the number of bits used to represent the video block. After quantizing the coefficient block, video encoder 20 may perform and entropy encoding (e.g., context-adaptive binary arithmetic coding (CABAC), context-adaptive variable length coding (CAVLC), exponential-Golomb coding, etc.) on syntax elements that represent coefficients in the coefficient block and on other syntax elements associated with the video block. Video encoder 20 may output a bitstream that includes the entropy-encoded syntax elements associated with the video block.

Video decoder 30 may receive a bitstream that includes an encoded representation of video data. Video decoder 30 may parse the bitstream to extract syntax elements from the bitstream. As part of extracting the syntax elements from the bitstream, video decoder 30 may apply entropy decoding to portions of the bitstream. For each respective video block of each frame of the video data, video decoder 30 may perform, based at least in part on the syntax elements associated with the respective video block, inter or intra prediction to generate a predictive pixel block for the respective video block. In addition, video decoder 30 may inverse quantize coefficients of coefficient blocks associated with the respective video block and may apply one or more inverse transforms to the coefficient blocks to generate a residual video block for the respective video block. Video decoder 30 may then reconstruct the respective video block based at least in part on the residual video block and the predictive pixel block. In this way, by reconstructing each of the video blocks of a frame, video decoder 30 may reconstruct the frame.

As mentioned above, video encoder 20 may perform inter prediction to generate a predictive pixel block that corresponds to a particular video block. More specifically, video encoder 20 may perform uni-directional inter prediction or bi-directional inter prediction to generate the predictive pixel block.

When video encoder 20 performs uni-directional inter prediction for a particular video block, video encoder 20 may search for a reference block within reference pictures in a single reference picture list. The reference block may be a block of samples that is similar to the particular video block. Furthermore, when video encoder 20 performs uni-directional inter prediction, video encoder 20 may generate motion information for the particular video block. The motion information for the particular video block may include a motion vector and a reference picture index. The motion vector may indicate a spatial displacement between a position of the particular video block within the current frame (i.e., the frame that includes the particular video block) and a position of the reference block within the reference frame. The reference picture index indicates a position within the reference picture list of the reference frame that contains the reference picture list. The predictive pixel block for the particular video block may be equal to the reference block.

When video encoder 20 performs bi-directional inter prediction for a particular video block, video encoder 20 may search for a first reference block within reference pictures in a first reference picture list ("list 0") and may search for a second reference block within reference pictures in a second reference picture list ("list 1"). Video encoder 20 may generate, based at least in part on the first and the second reference blocks, the predictive pixel block for the particular video block. In addition, video encoder 20 may generate a first motion vector that indicates a spatial displacement between the particular video block and the first reference block. Video encoder 20 may also generate a first reference picture index that identifies a location within the first reference picture list of the reference picture that contains the first reference block. Furthermore, video encoder 20 may generate a second motion vector that indicates a spatial displacement between the particular video block and the second reference block. Video encoder 20 may also generate a second reference picture index that identifies a location within the second reference picture list of the reference picture that includes the second reference block.

When video encoder 20 performs uni-directional inter prediction on a particular video block, video decoder 30 may use the motion information of the particular video block to identify the reference sample of the particular video block. Video decoder 30 may then generate the predictive pixel block of the particular video block based on the reference sample of the particular video block. When video encoder 20 performs bi-directional inter prediction on a particular video block, video decoder 30 may use the motion information of the particular video block to identify the two reference samples of the particular video block. Video decoder 30 may generate the predictive pixel block of the particular video block based on the two reference samples of the particular video block.

Multiview Video Coding (MVC) is an extension of the H.264 standard. In the MVC extension to H.264, there may be multiple views of the same scene from different viewpoints. The term "access unit" is used to refer to the set of pictures that correspond to the same time instance. Thus, video data may be conceptualized as a series of access units occurring over time.

MVC supports inter-view prediction. Inter-view prediction is similar to the inter prediction used in H.264 and may use the same syntax elements. However, when a video coder performs inter-view prediction on a video block, video encoder 20 may use, as a reference picture, a picture that is in the same access unit as the video block, but in a different view. In contrast, conventional inter prediction only uses pictures in different access units as reference pictures. In MVC, a view is referred to as a "base view" if a video decoder (e.g., video decoder 30) can decode pictures in the view without reference to pictures in any other view.

In addition to encoding multiple views, there is an ongoing effort to generate a three-dimensional video (3DV) coding extension to H.264. The 3DV extension to H.264 provides for depth maps. Depth maps are pictures whose pixel values represent the three-dimensional depths of objects shown in corresponding "texture" pictures. In some examples, brighter pixel values in a depth map may correspond to objects that are closer to a camera and darker pixel values in a depth map may correspond to objects that are further from the camera. The "texture" pictures may include normal H.264/AVC pictures.

In the 3DV extension, video encoder 20 may encode a depth map in the same manner as other views of an access unit. That is, video encoder 20 may use inter prediction and/or intra prediction to encode video blocks of depths maps. Video encoder 20 may encode a depth map as part of an access unit that includes texture pictures for different views. A depth map for an access unit may also be referred to as a "depth view component" of the access unit. The term "view component" may be used to refer to either texture view components or the depth view component of an access unit.

Video encoder 20 may generate, based on one or more view components, a synthetic reference picture and include the synthetic reference picture in one or more reference picture lists. For example, video encoder 20 may use Depth Image Based Rendering (DIBR) to generate, based on available texture and depth view components, a synthetic texture view component. A synthetic texture view component may be a texture view component that is synthesized based on a depth map and one or more texture view components. In some instances, a synthetic texture view component may be used as a reference picture in inter prediction or as a reference picture in inter-view prediction. Synthetic texture view components that are used as reference pictures may be referred to as view synthesis reference pictures (VSRPs). Video coders may include VSRPs in reference picture lists.

As mentioned above, video coders (e.g., video encoder 20 and video decoder 30) may maintain a first reference picture list (list 0) and a second reference picture list (list 1). List 0 and list 1 may be lists of reference pictures. Video encoder 20 may signal that a video block is inter-predicted using a reference block in a particular reference picture in part by signaling a position in a reference picture list of the particular reference picture.

In H.264/AVC and H.264/MVC, video coders always generate reference picture lists such that temporal (i.e., intra-view) reference pictures are always initially listed first. The temporal reference pictures are followed in the reference picture lists by the inter-view reference pictures. That is, a video coder may construct a reference picture using the following steps. First, the video coder may apply a reference picture list initialization process for temporal (i.e., intra-view) reference pictures as specified in the H.264 standard, wherein reference pictures from other views are not considered. Second, the video coder may append inter-view reference pictures to the end of the reference picture list in an order that the inter-view reference pictures occur in the MVC SPS extension. Third, the video coder may apply a reference picture list modification (RPLM) process for both intra-view and inter-view reference pictures. Inter-view reference pictures may be identified in RPLM commands by their index values, as specified by the MVC SPS extension. The RPLM process is described in detail below.

Some reference pictures are "short-term" reference pictures and some reference pictures are "long-term" reference pictures. Long-term reference pictures may remain in the reference picture lists for longer periods of time than short-term reference pictures. If video encoder 20 determines that it would be advantageous to maintain the availability of a reference picture for an extended period of time, video encoder 20 may signal that the reference picture is a long-term reference picture. For instance, video encoder 20 may indicate that a reference frame is a long-term reference picture if the reference picture contains a static background and other pictures cover and uncover portions of this static background. In H.264/AVC or H.264/MVC, a short-term reference picture never has a frame number (frame_num) equal to the frame number of the current picture (i.e., the picture that is currently being coded). A frame number of a picture is a value based on a picture number of the picture. The frame number of a picture may be used to identify the picture when the picture is used as a short-term reference picture.

In some instances, it may be advantageous to change the order of reference pictures in a reference picture list. For instance, because positions may be signaled using unary values, fewer bits may be required to indicate the first position in a reference picture list than a last position in the reference picture list. Hence, if a particular reference picture is likely to be used frequently, it may be advantageous to have the particular reference picture closer to the first position in the reference picture list than to the last position in the reference picture list.

Accordingly, video encoder 20 may include a series of one or more reference picture list modification (RPLM) commands that instruct video decoder 30 to modify a reference picture list. Video encoder 20 may include the RPLM commands in a slice header of a coded slice. Table 1, below, shows an example syntax for RPLM commands that may be included in a slice header.

TABLE 1

RPLM syntax

| ref_pic_list_mvc_modification( ) { | C | Descriptor |
|---|---|---|
|   if( slice_type % 5 != 2 && slice_type % 5 != 4 ) { | | |
|     ref_pic_list_modification_flag_l0 | 2 | u(1) |
|     if( ref_pic_list_modification_flag_l0 ) | | |
|       do { | | |
|         modification_of_pic_nums_idc | 2 | ue(v) |
|         if( modification_of_pic_nums_idc == 0 \|\| | | |
|           modification_of_pic_nums_idc == 1 ) | | |
|           abs_diff_pic_num_minus1 | 2 | ue(v) |
|         else if( modification_of_pic_nums_idc == 2 ) | | |
|           long_term_pic_num | 2 | ue(v) |
|         else if ( modification_of_pic_nums_idc == 4 \|\| | | |
|           modification_of_pic_nums_idc == 5 ) | | |
|           abs_diff_view_idx_minus1 | 2 | ue(v) |
|       } while( modification_of_pic_nums_idc != 3 ) | | |
|   } | | |
|   if( slice_type % 5 == 1 ) { | | |
|     ref_pic_list_modification_flag_l1 | 2 | u(1) |
|     if( ref_pic_list_modification_flag_l1 ) | | |
|       do { | | |
|         modification_of_pic_nums_idc | 2 | ue(v) |
|         if( modification_of_pic_nums_idc == 0 \|\| | | |
|           modification_of_pic_nums_idc == 1 ) | | |
|           abs_diff_pic_num_minus1 | 2 | ue(v) |
|         else if( modification_of_pic_nums_idc == 2 ) | | |
|           long_term_pic_num | 2 | ue(v) |
|         else if ( modification_of_pic_nums_idc == 4 \|\| | | |
|           modification_of_pic_nums_idc == 5 ) | | |
|           abs_diff_view_idx_minus1 | 2 | ue(v) |
|       } while( modification_of_pic_nums_idc != 3 ) | | |
|   } | | |
| } | | |

In the example syntax of Table 1, syntax elements with type descriptor ue(v) are unsigned variable-length values encoded using exponential-Golomb coding with left bit first. Syntax elements with type descriptors of the form u(n), where n is an non-negative integer, are unsigned values that have lengths equal to n.

In Table 1, "slice_type" indicates a type of a current slice (i.e., the slice whose slice header includes the RPLM commands). Table 2, below, indicates example semantics of "slice_type."

TABLE 2

| slice_type | Name of slice_type |
|---|---|
| 0 | P (P slice) |
| 1 | B (B slice) |
| 2 | I (I slice) |
| 3 | SP (SP slice) |
| 4 | SI (SI slice) |
| 5 | P (P slice) |
| 6 | B (B slice) |
| 7 | I (I slice) |
| 8 | SP (SP slice) |
| 9 | SI (SI slice) |

"slice_type" values in the range 5.9 specify, in addition to the coding type of the current slice, that all other slices of the current coded picture shall have a value of slice_type equal to the current value of slice_type or equal to the current value of slice_type, minus 5.

Furthermore, in the example syntax of Table 1, the "ref_pic_list modification_flag_l0" syntax element indicates whether there are one or more "modification_of_pic_nums_idc" syntax elements to modify list 0. The "ref_pic_list_modification_flag_l1" syntax element indicates whether there are one or more "modification_of_pic_nums_idc" syntax elements to modify list 1.

The "modification_of_pic_nums_idc" syntax element specifies a type of RPLM command to perform. In this way, the "modification_of_pic_nums_idc" syntax element is an example of an RPLM type identifier. In some examples, the "modification_of_pic_nums_idc" syntax element may have a value ranging from 0 to 5, inclusive. If the "modification_of_pic_nums_idc" syntax element is equal to 0, the bitstream includes a "abs_diff_pic_num_minus1" syntax element that specifies an amount to subtract from a picture number prediction value. If the "modification_of_pic_nums_idc" syntax element is equal to 1, the bitstream includes the "abs_diff_pic_num_minus1" syntax element that specifies an amount to add to the picture number prediction value. If the "modification_of_pic_nums_idc" syntax element is equal to 2, the bitstream includes the "long_term_pic_num" syntax element that specifies a long-term picture number.

If the "modification_of_pic_nums_idc" syntax element is equal to 4, the bitstream includes the "abs_diff_view_idx_minus1" syntax element and the "abs_diff_view_idx_minus1" syntax element corresponds to a value to subtract from a prediction value of a reference view index. If the RPLM type syntax element is equal to 5, the bitstream includes a syntax element (e.g., "abs_diff_view_idx_minus1") that corresponds to a value to add to a prediction value of a reference view index. RPLM commands with the RPLM type syntax element equal to 0 or 1 may be referred to as RPLM commands for short-term reference pictures or RPLM commands that belong to a type of RPLM commands for inserting short-term reference pictures into reference picture lists. If the "modification_of_pic_nums_idc" syntax element is equal to 3, the "modification_of_pic_nums_idc" syntax element indicates that a modification of the reference picture list is complete.

Video decoder 30 processes the RPLM commands in the order the RPLM commands are signaled in the bitstream. Furthermore, when video decoder 30 processes a series of RPLM commands, video decoder 30 may initially set a current index value to 0 and may increment the current index value during processing of each RPLM command. When video decoder 30 processes a RPLM command, video decoder 30 may shift down in the reference picture list, by one position, the reference picture at the position indicated by the current index value and all reference pictures at positions following the position indicated by the current index value. Video decoder 30 may then insert a reference picture into the reference picture list at the position indicated by the current index value. Video decoder 30 may then scan through the reference picture list and remove, if present, a duplicate of the inserted reference picture.

Video decoder 30 uses the "modification_of_pic_nums_idc" syntax elements, "abs_diff_pic_num_pic_minus1" syntax elements, and "long_term_pic_num" syntax elements of an RPLM command to determine the picture number associated with the RPLM command. The picture number associated with the RPLM command may be the picture number of a reference picture to insert into the reference picture list. For instance, if video decoder 30 processes a RPLM command that includes a "modification_of_pic_nums_idc" syntax element that is equal to 0, video decoder 30 may determine a picture number of a reference picture to insert into the reference picture list by subtracting the value of the "abs_diff_pic_num_pic_minus1" syntax element, plus 1, from a picture number prediction value. If video decoder 30 processes a RPLM command that includes a "modification_of_pic_nums_idc" syntax element that is equal to 1, video decoder 30 may determine a picture number of a reference picture to insert into the reference picture list by adding the value of the "abs_diff_pic_num_pic_minus1" syntax element, plus 1, to the picture number prediction value. The picture number prediction value is initially equal to the picture number of the current frame. After determining a picture number of the reference picture to insert into the reference picture list, video decoder 30 sets the picture number prediction value to be equal to the determined picture number.

If video decoder 30 processes a RPLM command that includes a "modification_of_pics_nums_idc" syntax element that is equal to 4, video decoder 30 may determine a view index of a reference picture to insert into the reference picture list by subtracting the value of the "abs_diff_view_idx_minus1" syntax element, plus 1, from a prediction value of a reference view index. If video decoder 30 processes a RPLM command that includes a "modification_of_pics_nums_idc" syntax element that is equal to 5, video decoder 30 may determine a view index of a reference picture to insert into the reference picture list by adding the value of the "abs_diff_view_idx_minus1" syntax element, plus 1, to the prediction value of a reference view index. The prediction value of the reference view index may initially be equal to −1. After determining a view index of the reference picture to insert into the reference picture list, video decoder 30 may set the prediction value of the reference view index to be equal to the determined view index.

If video decoder 30 processes a RPLM command that includes a "modification_of_pic_nums_idc" syntax element that is equal to 2, video decoder 30 may insert into the reference picture list a reference picture having a picture number equal to the value of the "long_term_pic_num" syntax element. If video decoder 30 processes a RPLM command that includes a "modification_of_pic_nums_idc" syntax element that is equal to 3, video decoder 30 may end the process of modifying the reference picture list.

By including RPLM commands in the bitstream, video encoder 20 may flexibly arrange temporal and view prediction references, which may provide potential coding efficiency gains. In addition, the use of RPLM commands may increase error resilience because reference picture selection and redundant picture mechanisms may be extended to the view dimension.

In the current MVC design, it is not possible to use short-term reference picture RPLM commands to insert a synthesized reference picture, such as a VSRP, at a particular position in a reference picture list. Short-term reference picture RPLM commands may instruct a video decoder to insert a short-term reference picture into a reference picture list. For example, RPLM commands with RPLM type identifiers (e.g., "modification_of_pic_nums_idc" syntax elements) with values equal to 0, 1, 4, or 5 are short-term reference picture RPLM commands. Thus, even if the synthesized reference pictured is frequently used as a reference picture, the synthesized reference picture cannot be moved to an earlier position in the reference picture list. This may unnecessarily increase the number of bits used to indicate the position in the reference picture list of the synthesized reference picture.

In accordance with the techniques of this disclosure, video encoder 20 may generate one or more short-term reference picture RPLM commands. The one or more short-term reference picture RPLM commands may belong to a type of RPLM commands for inserting short-term reference pictures into reference picture lists. Likewise, video decoder 30 may modify, in response to one or more short-term reference picture RPLM commands, a reference picture list to include a synthesized reference picture. Video decoder 30 may use one or more pictures in the reference picture list to perform inter prediction on video blocks of a current picture.

As indicated above, in H.264/AVC or H.264/MVC, a short-term reference picture never has a frame number (frame_num) equal to the frame number of the current picture (i.e., the picture that is currently being coded). In accordance with the techniques of this disclosure, short-term reference picture RPLM commands may be reused to identify a synthesized reference picture in 3D video coding. For instance, when a short-term reference picture RPLM command is associated with a frame number of a reference picture that is equal to the frame number of the current frame, the RPLM command is referring to a synthesized reference picture. In other words, a frame number equal to the frame number of the current picture denotes a synthesized reference picture in RPLM commands. In this way, a synthesized reference picture may be inserted into any position in a reference picture list by adding one RPLM command that has a modification_of_pic_nums_idc equal to 0 or 1.

For example, the frame number of the current frame may be 5 and the frame numbers of two short-term reference pictures may be 3 and 4, respectively. The short-term reference pictures are to be added in a reference picture list. In addition, one synthesized reference picture is also to be added in the reference picture list. To construct the reference picture list with the following order: short-term reference picture with frame number equal to 4, the synthesized reference picture, and short-term reference picture with frame number equal to 3, video encoder 20 may signal the following RPLM commands in the following order:

1. (modification_of_pic_nums_idc, abs_diff_pic_num_minus1)=(0, 0)
2. (modification_of_pic_nums_idc, abs_diff_pic_num_minus1)=(1, 0)
3. (modification_of_pic_nums_idc, abs_diff_pic_num_minus1)=(0, 1)
4. (modification_of_pic_nums_idc)=(3)

As explained above, if the "modification_of_pic_nums_idc" syntax element is equal to 0, video decoder 30 may determine a frame number of a reference picture to insert into the reference picture list by subtracting the value of the "abs_diff_pic_num_minus1" syntax element, plus 1, from a picture number prediction value. If the "modification_of_pic_nums_idc" syntax element is equal to 1, video decoder 30 may determine a frame number of a reference picture to insert into the reference picture list by adding the value of the "abs_diff_pic_num_minus1" syntax element, plus 1, to the picture number prediction value. The picture number prediction value is initially equal to the picture number of the current frame. In this way, video decoder 30 may determine a picture number by adding or subtracting a value specified by an RPLM command, plus, 1, to a picture prediction value. After determining a picture number of the reference picture to insert into the reference picture list, video decoder 30 sets the picture number prediction value to be equal to the determined picture number.

Hence, in response to the first RPLM command above, video decoder 30 may insert a reference frame having the frame number 4 (i.e., 5−(0+1)=4) into the reference picture list at position 0, and shift down all other reference pictures in the reference picture list. In response to the second RPLM command above, video decoder 30 may insert a reference frame having the frame number 5 (i.e., 4+(0+1)=5) into the reference picture list at position 1, and shift down all following reference pictures in the reference picture list. Because the determined frame number "5" is equal to the frame number of the current frame, video decoder 30 inserts a synthesized reference picture into the reference picture list in response to the second RPLM command. In response to the third RPLM command, video decoder 30 may insert a reference frame having frame number 3 (i.e., 5−(1+1)=3) into the reference picture list at position 2, and shift down all following reference pictures in the reference picture list. In this way, video decoder 30 may insert, in response to a second RPLM command, a texture view component into the reference picture list, where the second RPLM command belongs to the type of RPLM commands for inserting short-term reference pictures into the reference picture list. In response to the fourth RPLM command, video decoder 30 may stop the process of modifying the reference picture list.

Figure 2:
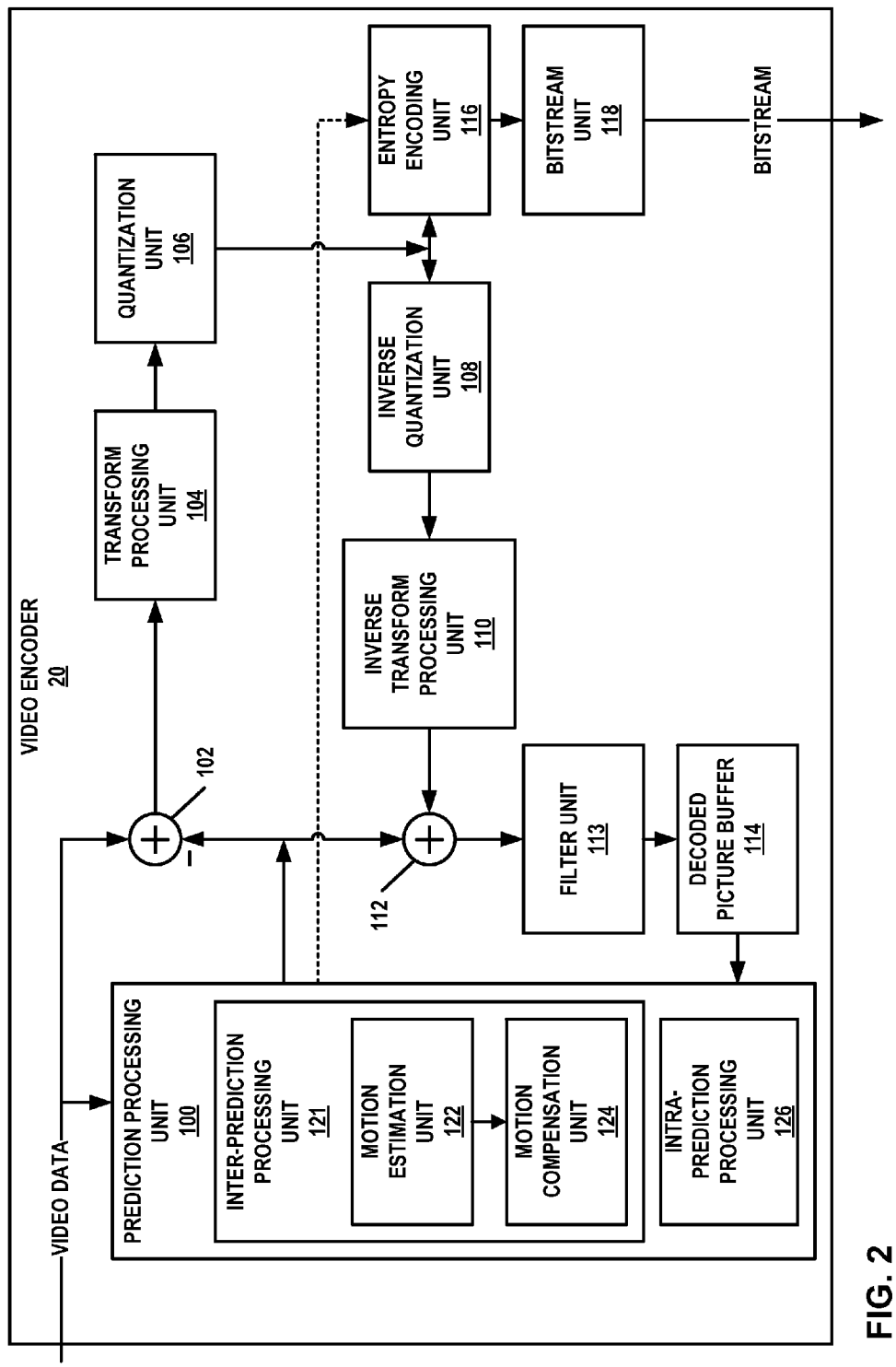
FIG. 2 is a block diagram illustrating an example video encoder that may implement the techniques described in this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of H.264 coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, an entropy encoding unit 116, and a bitstream unit 118. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 may receive video data. To encode the video data, video encoder 20 may encode each slice of each picture of the video data. As part of encoding a slice, video encoder 20 may encode video blocks in the slice.

Inter-prediction processing unit 121 may generate predictive data for a video block by performing inter prediction on the video block. The predictive data for the video block may include a predictive pixel block that corresponds to the video block and motion information for the video block.

Slices may be I slices, P slices, or B slices. Motion estimation unit 122 and motion compensation unit 124 may perform different operations for a video block depending on whether the video block is in an I slice, a P slice, or a B slice. In an I slice, all video blocks are intra predicted. Hence, if the video block is in an I slice, motion estimation unit 122 and motion compensation unit 124 do not perform inter prediction on the video block.

If the video block is in a P slice, motion estimation unit 122 may search the reference pictures in a reference picture list (e.g., list 0) for a reference block for the video block. The reference block of the video block may be a pixel block that most closely corresponds to the video block. Motion estimation unit 122 may use a variety of metrics to determine how closely a pixel block in a reference picture corresponds to the video block. For example, motion estimation unit 122 may determine how closely a pixel block in a reference picture corresponds to the video block by sum of absolute difference (SAD), sum of square difference (SSD), or other difference metrics.

Motion estimation unit 122 may generate a reference picture index that indicates the reference picture in list 0 containing a reference block of a video block in a P slice and a motion vector that indicates a spatial displacement between the video block and the reference block. Motion estimation unit 122 may output the reference picture index and the motion vector as the motion information of the video block. Motion compensation unit 124 may generate the predictive pixel block for the video block based on the reference block indicated by the motion information of the video block.

If the video block is in a B slice, motion estimation unit 122 may perform uni-directional inter prediction or bi-directional inter prediction for the video block. To perform uni-directional inter prediction for the video block, motion estimation unit 122 may search the reference pictures of list 0 or list 1 for a reference block for the video block. Motion estimation unit 122 may generate a reference picture index that indicates a position in list 0 or list 1 of the reference picture that contains the reference block and a motion vector that indicates a spatial displacement between the video block and the reference block. Motion estimation unit 122 may also generate a prediction direction indicator that indicates whether the reference picture is in list 0 or list 1.

To perform bi-directional inter prediction for a video block, motion estimation unit 122 may search the reference pictures in list 0 for a reference block for the video block and may also search the reference pictures in list 1 for another reference block for the video block. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the video block. The motion information of the video block may include the reference picture indexes and the motion vectors of the video block. Motion compensation unit 124 may generate the predictive sample blocks of the video block based on the reference blocks indicated by the motion information of the video block.

Intra-prediction processing unit 126 may generate predictive data for a video block by performing intra prediction on the video block. The predictive data for the video block may include a predictive pixel block for the video block and various syntax elements. Intra-prediction processing unit 126 may perform intra prediction on video block in I slices, P slices, and B slices.

To perform intra prediction on a video block, intra-prediction processing unit 126 may use multiple intra prediction modes to generate multiple sets of predictive data for the video block. To use an intra prediction mode to generate a set of predictive data for the video block, intra-prediction processing unit 126 may extend samples from neighboring video blocks across the video block in a direction associated with the intra prediction mode. The neighboring video blocks may be above, above and to the right, above and to the left, or to the left of the video block, assuming a left-to-right, top-to-bottom encoding order for video blocks. In some examples, the number of intra prediction modes may depend on the size of the video block.

Prediction processing unit 100 may select the predictive data for a video block from among the predictive data generated by inter-prediction processing unit 121 for the video block or the predictive data generated by intra-prediction processing unit 126 for the video block. In some examples, prediction processing unit 100 selects the predictive data for the video block based on rate/distortion metrics of the sets of predictive data.

Residual generation unit 102 may generate residual sample blocks by subtracting samples in a predictive pixel block from corresponding samples of a video block. Transform processing unit 104 may generate coefficient blocks for each residual sample block by applying one or more transforms to the residual sample block. Transform processing unit 104 may apply various transforms to a residual sample block. For example, transform processing unit 104 may apply a discrete cosine transform (DCT), a directional transform, or a conceptually similar transform to a residual sample block.

Quantization unit 106 may quantize the coefficients in a coefficient block. The quantization process may reduce the bit depth associated with some or all of the coefficients. For example, an n-bit coefficient may be rounded down to an m-bit coefficient during quantization, where n is greater than m. Quantization unit 106 may quantize a coefficient block based on a quantization parameter (QP) value. Video encoder 20 may adjust the degree of quantization applied to coefficient blocks by adjusting the QP value.

Inverse quantization unit 108 and inverse transform processing unit 110 may apply inverse quantization and inverse transforms to a coefficient block, respectively, to reconstruct a residual sample block from the coefficient block. Reconstruction unit 112 may add samples in the reconstructed residual sample block to corresponding samples from one or more predictive sample blocks generated by prediction processing unit 100 to produce a reconstructed video block. Filter unit 113 may perform a deblocking operation to reduce blocking artifacts in the reconstructed video block. Decoded picture buffer 114 may store the reconstructed video block after filter unit 113 performs the one or more deblocking operations on the reconstructed video block. Motion estimation unit 122 and motion compensation unit 124 may use a reference picture that contains the reconstructed video blocks to perform inter prediction on video blocks of subsequent pictures. In addition, intra-prediction processing unit 126 may use reconstructed video blocks in decoded picture buffer 114 to perform intra prediction.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb coding operation, or another type of entropy encoding operation on the data.

Bitstream unit 118 may output a bitstream that includes the entropy-encoded data generated by entropy encoding unit 116. The bitstream may include data that represent one or more RPLM commands generated by inter-prediction processing unit 121. The RPLM commands may include one or more short-term reference picture RPLM commands that instruct a video decoder to modify a reference picture list to include a synthesized reference picture.

Figure 3:
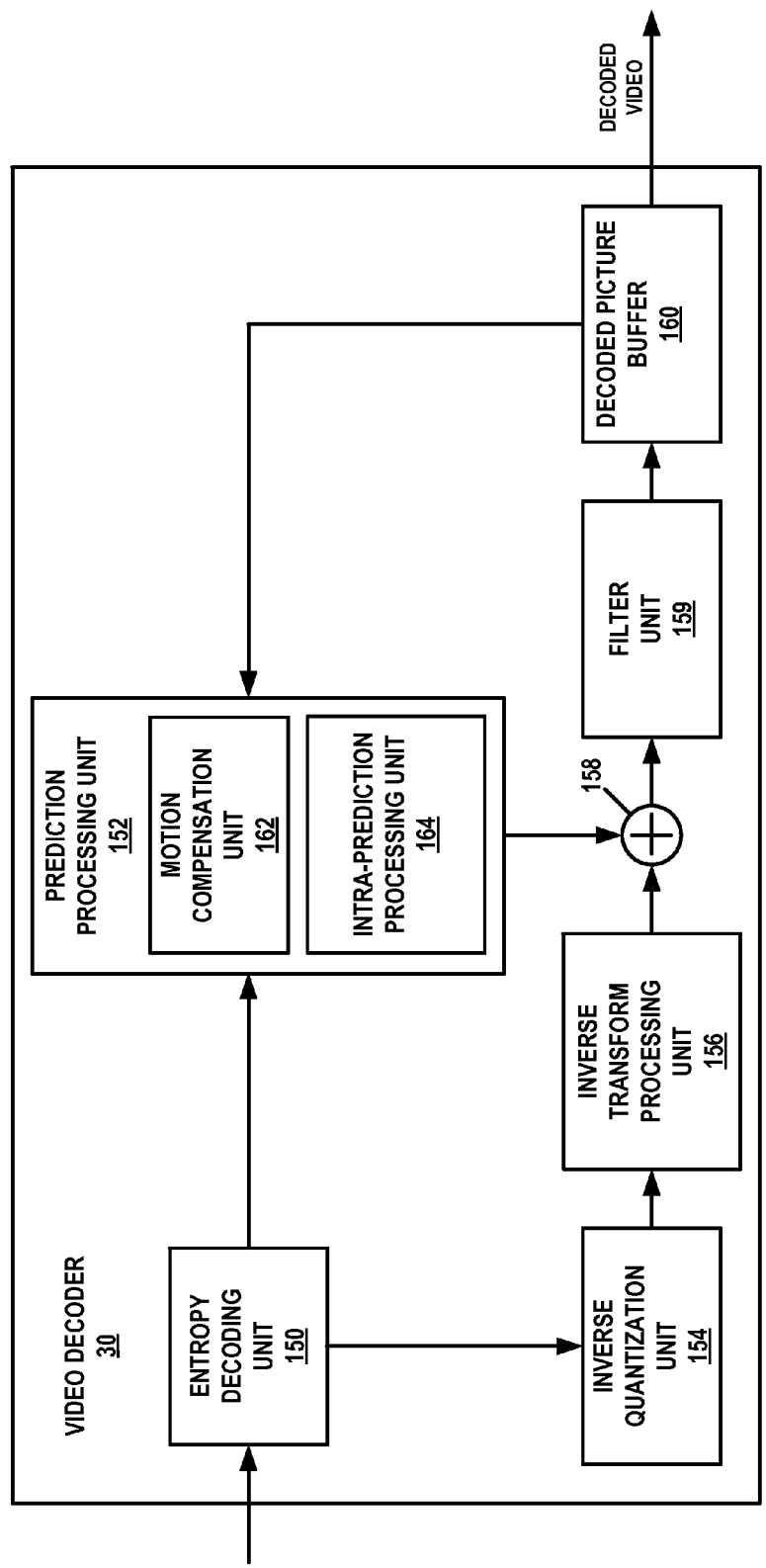
FIG. 3 is a block diagram illustrating an example video decoder that may implement the techniques described in this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of H.264 coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream. Entropy decoding unit 150 may parse the bitstream to extract syntax elements from the bitstream. As part of parsing the bitstream, entropy decoding unit 150 may entropy decode (e.g., CABAC decode) entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream. The syntax elements extracted from the bitstream may include syntax elements that represent coefficient blocks.

Prediction processing unit 152 may generate a first reference picture list (list 0) and a second reference picture list (list 1) based on syntax elements associated with a slice. As part of generating the reference picture lists, prediction processing unit 152 may modify the reference picture lists in response to RPLM commands. For instance, prediction processing unit 152 may modify, in response to one or more short-term reference picture commands, a reference picture list to include a synthesized reference picture, such as a VSRP.

Inverse quantization unit 154 may inverse quantize, i.e., de-quantize, coefficient blocks. Inverse quantization unit 154 may use a QP value to determine a degree of quantization and, likewise, a degree of inverse quantization for inverse quantization unit 154 to apply. After inverse quantization unit 154 inverse quantizes a coefficient block, inverse transform processing unit 156 may apply one or more inverse transforms to the coefficient block in order to generate a residual sample block. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a video block is encoded using intra prediction, intra-prediction processing unit 164 may perform intra prediction to generate a predictive pixel block for the video block. For example, intra-prediction processing unit 164 may determine an intra prediction mode for the video block based on syntax elements in the bitstream. Intra-prediction processing unit 164 may use the intra prediction mode to generate the predictive pixel block for the video block based on spatially-neighboring video blocks.

Furthermore, if a video block is encoded using inter prediction, entropy decoding unit 150 may extract motion information for the video block. Motion compensation unit 162 may determine, based on the motion information of the video block, one or more reference blocks for the video block. Motion compensation unit 162 may generate, based on the one or more reference blocks for the video block, a predictive pixel block for the video block.

Reconstruction unit 158 may reconstruct a video block based on the residual pixel block for the video block and the predictive pixel block of the video block. In particular, reconstruction unit 158 may add samples (e.g., luma or chroma components) of the residual pixel block to corresponding samples of the predictive pixel block to reconstruct the video block. Filter unit 159 may perform a deblocking operation to reduce blocking artifacts associated with the video block. Video decoder 30 may store video blocks in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
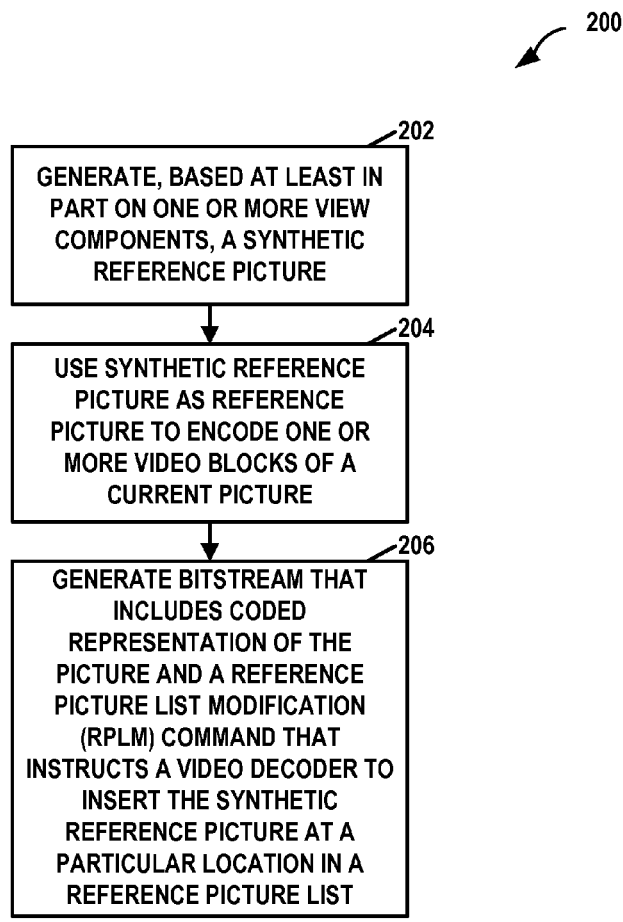
FIG. 4 is a flowchart that illustrates an example operation performed by the video encoder as part of a process to encode video data, in accordance with one or more techniques of this disclosure.

FIG. 4 is a flowchart that illustrates an example operation 200 performed by video encoder 20 as part of a process to encode video data, in accordance with one or more techniques of this disclosure. The flowchart of FIG. 4 and the flowcharts of the following figures are provided as examples. In other examples, the techniques of this disclosure may be implemented using more, fewer, or different steps than those shown in the example of FIG. 4 and the following figures.

In the example of FIG. 4, inter-prediction processing unit 121 of video encoder 20 generates, based at least in part on one or more view components, a synthetic reference picture (202). In some examples, the synthetic reference picture is a VSRP. Inter-prediction processing unit 121 may use the synthetic reference picture as a reference picture for encoding one or more video blocks of a current picture (204). In addition, bitstream unit 118 may generate a bitstream that includes a coded representation of the picture and a RPLM command that instructs a video decoder to insert the synthetic reference picture at a particular location in a reference picture list (206).

Figure 5:
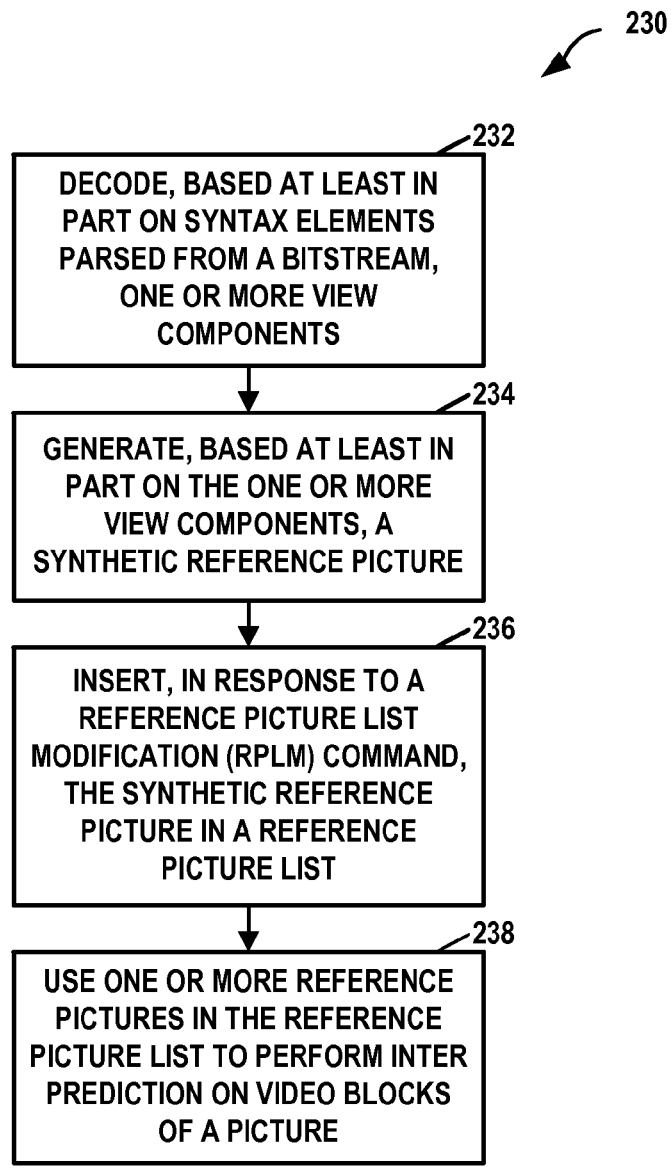
FIG. 5 is a flowchart that illustrates an example operation performed by the video decoder as part of a process to decode encoded video data, in accordance with one or more techniques of this disclosure.

FIG. 5 is a flowchart that illustrates an example operation 230 performed by video decoder 30 as part of a process to decode encoded video data, in accordance with one or more techniques of this disclosure. In the example of FIG. 5, video decoder 30 decodes, based at least in part on syntax elements parsed from a bitstream, one or more view components (232). In addition, video decoder 30 may generate, based at least in part on the one or more view components, a synthetic reference picture (234). For instance, video decoder 30 may perform DIBR to generate, based on a texture view component of an access unit and a depth view component of the access unit, a VSRP.

Figure 6:
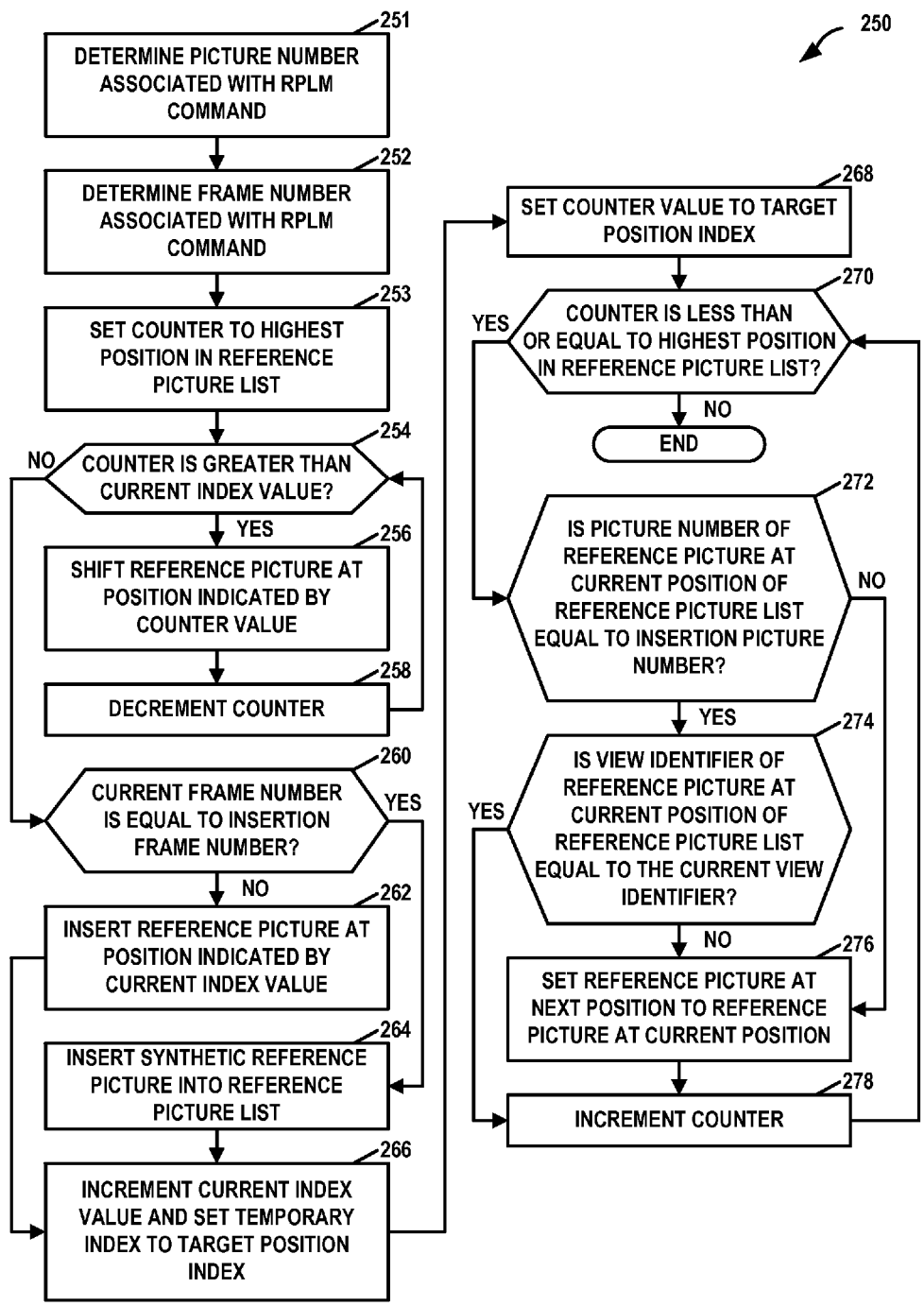
FIG. 6 is a flowchart that illustrates an example operation of the video decoder to insert a short-term reference picture or a synthesized reference picture into a reference picture list, in accordance with one or more techniques of this disclosure.

Prediction processing unit 152 may insert, in response to a RPLM command, the synthetic reference picture at a particular location within a reference picture list (236). The RPLM command may belong to a type of RPLM commands for inserting short-term reference pictures into reference picture lists. FIG. 6, described in detail below, is a flowchart that illustrates an example operation to insert a short-term reference picture or synthetic reference picture into a reference picture list. After prediction processing unit 152 has inserted the short-term reference picture or the synthetic reference picture into the reference picture list, motion compensation unit 162 may use one or more reference pictures in the reference picture list to perform inter prediction on video blocks of a picture (238). In some instances, motion compensation unit 162 may use the inserted synthetic reference picture as a reference picture for inter-view prediction.

FIG. 6 is a flowchart that illustrates an example operation 250 of video decoder 30 to insert a short-term reference picture or a synthesized reference picture into a reference picture list, in accordance with one or more techniques of this disclosure. In the example of FIG. 6, prediction processing unit 152 determines a picture number associated with a RPLM command (251). For instance, if the RPLM type identifier of the RPLM command is equal to 0 or 1, prediction processing unit 152 may determine the picture number associated with the RPLM command by adding or subtracting a value specified by the RPLM command, plus 1, to a picture number prediction value. In addition, prediction processing unit 152 may determine a frame number associated with the RPLM command based on the picture number associated with the RPLM command (252). In some examples, the frame number associated with the RPLM command may be the least-significant bits of the picture number associated with the RPLM command.

Furthermore, prediction processing unit 152 may set a counter value to an index of a last position in a reference picture list (253). Prediction processing unit 152 may then determine whether the counter value is greater than a current index value (254). When prediction processing unit 152 starts processing a series of RPLM commands in a slice header, prediction processing unit 152 may initially set the current index value to zero and may increment the current index value during processing of each RPLM command in the series.

In response to determining that the counter value is greater than the current index value ("YES" of 254), prediction processing unit 152 may shift, in the reference picture list, a reference picture at the position indicated by the counter value to a following position in the reference picture list (256). Next, prediction processing unit 152 may decrement the counter value (258). After decrementing the counter value, prediction processing unit 152 may determine again whether the counter value is greater than the current index value (254). If so, prediction processing unit 152 may repeat actions 256 and 258. In this way, prediction processing unit 152 may shift down in the reference picture list all reference frame numbers that follow the current index value. Thus, if prediction processing unit 152 is inserting a synthesized reference picture into the reference picture list at a given position, prediction processing unit 152 may shift positions in the reference picture list of the pictures after the given position.

In response to determining that the counter value is not greater than the current index value ("NO" of 254), prediction processing unit 152 may determine whether a current frame number is equal to an insertion frame number (260). The current frame number is the frame number of the picture that prediction processing unit 152 is currently decoding. The insertion frame number is the frame number of the picture that prediction processing unit 152 is inserting in the reference picture list. In response to determining that the current frame number is not equal to the insertion frame number ("NO" of 260), prediction processing unit 152 may insert the reference picture into the reference picture list at a position indicated by the current index value (262). The frame number of a picture may be the LSB portion of a picture number of the picture. Because the current frame number is not equal to the insertion frame number, the reference picture being inserted into the reference picture list is a short-term reference picture and not a synthesized reference picture.

On the other hand, in response to determining that the current frame number is equal to the insertion frame number ("YES" of 260), prediction processing unit 152 may insert a synthetic reference picture into the reference picture list at a position indicated by the current index value (264). Because the current frame number is equal to the insertion frame number, the insertion frame number refers to a synthesized reference picture. In this way, if prediction processing unit 152 receives a RPLM command that belongs to a type of RPLM commands for inserting short-term reference pictures into reference picture lists, prediction processing unit 152 may determine a picture number associated with the RPLM command and insert a synthetic reference picture into the reference picture list in response to determining that the frame number associated with the RPLM command is equal to a frame number associated with the RPLM command. The frame number associated with the RPLM command may be a number used to refer to a short-term reference picture that has a picture number equal to the picture number associated with the RPLM command. In some examples, the picture number associated with the RPLM command may be determined based at least in part on the "abs_diff_pic_num_minus1" syntax element of the RPLM command and a picture number prediction value.

After inserting a reference picture into the reference picture list in actions 262 or 264, prediction processing unit 152 may increment the current index value and set a temporary index value to the current index value (266). In addition, prediction processing unit 152 may set a counter value to the current index value (268). Prediction processing unit 152 may then determine whether the counter value is less than or equal to the highest position in the reference picture list (270). If the counter is not less than or equal to the highest position in the reference picture list ("NO" of 270), prediction processing unit 152 may end operation 250. On the other hand, in response to determining that the counter is less than or equal to the highest position in the reference picture list ("YES" of 270), prediction processing unit 152 may determine whether a picture number of the reference picture at a current position (i.e., the position indicated by the counter value) in the reference picture list is equal to the insertion frame number (272). If the picture number of the reference picture at the current position in the reference picture list is equal to the insertion frame number ("YES" of 272), prediction processing unit 152 may determine whether a view identifier of the reference picture at the position in the reference picture list indicated by the counter value is equal to a current view identifier (274). The current view identifier may be the view identifier of the picture that video decoder 30 is currently decoding.

If the picture number of the reference picture at the current position in the reference picture list is not equal to the insertion frame number ("NO" of 272) or the view identifier of the reference picture at the current position in the reference picture list is not equal to the current view identifier ("NO" of 274), prediction processing unit 152 may set the reference picture at the temporary index value, plus 1, to be the reference picture at the current position in the reference picture list (i.e., the position in the reference picture list indicated by the counter value) (276). In response to determining that the view identifier of the reference picture at the current position in the reference picture list is equal to the current view identifier ("YES" of 274) or after performing action 276, prediction processing unit 152 may increment the counter value (278). Prediction processing unit 152 may then determine again whether the counter value is less than or equal to the highest position in the reference picture list (270). Actions 268, 270, 272, 274, 276, and 278 may serve to remove, from the reference picture list, a duplicate of the reference picture being inserted into the reference picture list.

The example operation 250 may be implemented using the following pseudo-code:

```
for( cIdx = num_ref_idx_lX_active_minus1 + 1; cIdx > refIdxLX; cIdx- - )
    RefPicListX[ cIdx ] = RefPicListX[ cIdx - 1]
if (CurrPicNum != picNumLX)
    RefPicListX[ refIdxLX++ ] =
        short-term reference picture with PicNum equal to picNumLX
else
    RefPicListX[ refIdxLX++ ] = VSRP
nIdx = refIdxLX
for( cIdx = refIdxLX; cIdx <= num_ref_idx_lX_active_minus1 + 1; cIdx++ )
    if( PicNumF( RefPicListX[ cIdx ] ) != picNumLX ||
viewID(RefPicListX[ cIdx ] ) != currViewID )
        RefPicListX[ nIdx++ ] = RefPicListX[ cIdx ]
```

In the pseudo-code above, "cIdx" is a counter variable. "num_ref_idxlX_active_minus1" denotes the number of active reference pictures in a reference picture list X, where X is equal to 0 or 1. "refIdxX" denotes a position at which a short-term reference picture or a VSRP is to be inserted in reference picture list X. Furthermore, "RefPicListX[ ]" denotes reference picture list X. "picNumLX" denotes a frame number of a short-term reference picture or VSRP to be inserted in reference picture list X. An RPLM command may specify the value of "picNumLX." "PicNumF( )" is a function that returns a frame number of a reference picture. "viewID( )" is a function that returns a view identifier of a reference picture.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for multiview video decoding, the method comprising:
   decoding, based at least in part on syntax elements parsed from a bitstream that includes encoded video data, one or more view components;
   generating, based at least in part on the one or more view components, a synthetic reference picture;
   when a frame number of a reference picture associated with a decoded reference picture list modification (RPLM) command is equal to a frame number associated with a current picture which is currently being decoded and the RPLM command is a short-term reference picture RPLM command, inserting the synthetic reference picture at a particular location within a reference picture list; and
   using one or more pictures in the reference picture list to perform inter prediction on video blocks of the current picture.

2. The method of claim 1, wherein the synthetic reference picture is a view-synthesis reference picture (VSRP).

3. The method of claim 1, wherein inserting the synthetic reference picture comprises:
   determining a picture number associated with the RPLM command; and
   determining the frame number of the reference picture based on the picture number associated with the RPLM command.

4. The method of claim 3, wherein determining the picture number associated with the RPLM command comprises determining the picture number by adding or subtracting a value specified by the RPLM command, plus 1, to a picture number prediction value.

5. The method of claim 1, wherein the RPLM command includes an RPLM type identifier equal to 0 or 1.

6. The method of claim 1,
   wherein the reference picture list includes one or more pictures after the particular location, and
   wherein inserting the synthetic reference picture into the reference picture list at the particular location comprises shifting positions in the reference picture list of the one or more pictures after the particular location.

7. The method of claim 1, wherein the RPLM command is a first RPLM command and the method further comprises inserting, in response to a second RPLM command, a texture view component into the reference picture list, the second RPLM command being a short-term reference picture RPLM command.

8. A video decoding device that comprises:
   a storage medium configured to store encoded video data; and
   one or more processors configured to:
      decode, based at least in part on syntax elements parsed from a bitstream that includes the encoded video data, one or more view components;
      generate, based at least in part on the one or more view components, a synthetic reference picture;
      insert, when a frame number of a reference picture associated with a decoded reference picture list modification (RPLM) command is equal to a frame number associated with a current picture of the video data which is currently being decoded and the RPLM command is a short-term reference picture RPLM command, the synthetic reference picture at a particular location within a reference picture list; and
      use one or more pictures in the reference picture list to perform inter prediction on video blocks of the current picture.

9. The video decoding device of claim 8, wherein the synthetic reference picture is a view-synthesis reference picture (VSRP).

10. The video decoding device of claim 8, wherein the one or more processors are configured to:
    determine a picture number associated with the RPLM command; and
    determine the frame number of the reference picture based on the picture number associated with the RPLM command.

11. The video decoding device of claim 10, wherein the one or more processors are configured to determine the picture number by adding or subtracting a value specified by the RPLM command, plus 1, to a picture number prediction value.

12. The video decoding device of claim 8, wherein the RPLM command includes an RPLM type identifier equal to 0 or 1.

13. The video decoding device of claim 8,
    wherein the reference picture list includes one or more pictures after the particular location, and
    wherein the one or more processors are configured to shift positions in the reference picture list of the one or more pictures after the particular location.

14. The video decoding device of claim 8, wherein the RPLM command is a first RPLM command and the one or more processors are further configured to insert, in response to a second RPLM command, a texture view component into the reference picture list, the second RPLM command being a short-term reference picture RPLM command.

15. A video decoding device comprising:
    means for decoding, based at least in part on syntax elements parsed from a bitstream that includes encoded video data, one or more view components;
    means for generating, based at least in part on the one or more view components, a synthetic reference picture;
    means for inserting, when a frame number of a reference picture associated with a decoded reference picture list modification (RPLM) command is equal to a frame number associated with a current picture which is currently being decoded and the RPLM command is a short-term reference picture RPLM command, the synthetic reference picture at a particular location within a reference picture list; and
    means for using one or more pictures in the reference picture list to perform inter prediction on video blocks of the current picture.

16. The video decoding device of claim 15, wherein the synthetic reference picture is a view-synthesis reference picture (VSRP).

17. The video decoding device of claim 15, comprising:
  means for determining a picture number associated with the RPLM command; and
  means for determining the frame number of the reference picture based on the picture number associated with the RPLM command.

18. The video decoding device of claim 15, wherein the RPLM command includes an RPLM type identifier equal to 0 or 1.

19. A non-transitory computer-readable storage medium having stored thereon instructions that, when executed by one or more processors of a video decoding device, configure the video decoding device to:
  decode, based at least in part on syntax elements parsed from a bitstream that includes encoded video data, one or more view components;
  generate, based at least in part on the one or more view components, a synthetic reference picture;
  insert, when a frame number of a reference picture associated with a decoded reference picture list modification RPLM command is equal to a frame number associated with a current picture which is currently being decoded and the RPLM command is a short-term reference picture RPLM command, the synthetic reference picture at a particular location within a reference picture list; and
  use one or more pictures in the reference picture list to perform inter prediction on video blocks of the current picture.

20. The non-transitory computer-readable storage medium of claim 19, wherein the synthetic reference picture is a view-synthesis reference picture (VSRP).

21. The non-transitory computer-readable storage medium of claim 19, wherein the instructions configure the video decoding device to:
  determine a picture number associated with the RPLM command; and
  determine the frame number of the reference picture based on the picture number associated with the RPLM command.

22. The non-transitory computer-readable storage medium of claim 19, wherein the RPLM command includes an RPLM type identifier equal to 0 or 1.

23. A method for multiview video encoding, the method comprising:
  generating, based at least in part on one or more view components, a synthetic reference picture;
  using the synthetic reference picture as a reference picture to encode one or more video blocks of a current picture of video data; and
  generating a bitstream that includes a reference picture list modification (RPLM) command that is a short-term reference picture RPLM command, the RPLM command instructing a video decoder to insert the synthetic reference picture at a particular location in a reference picture list, wherein a frame number of a reference picture associated with the RPLM command is equal to a frame number associated with the current picture.

24. The method of claim 23, wherein the synthetic reference picture is a view-synthesis reference picture (VSRP).

25. The method of claim 23, wherein the RPLM command comprises a syntax element that has a value, wherein a picture number associated with the RPLM command is equal to a picture number prediction value plus or minus the value, plus 1, and the frame number of the reference picture associated with the RPLM command is determinable based on the picture number of the current picture.

26. The method of claim 23, wherein the RPLM command includes an RPLM type identifier equal to 0 or 1.

27. A video encoding device comprising:
  a storage medium configured to store video data; and
  one or more processors configured to:
    generate, based at least in part on one or more view components, a synthetic reference picture;
    use the synthetic reference picture as a reference picture to encode one or more video blocks of a current picture of the video data; and
    generate a bitstream that includes a reference picture list modification (RPLM) command that is a short-term reference picture RPLM command, the RPLM command instructing a video decoder to insert the synthetic reference picture at a particular location in a reference picture list, wherein a frame number of a reference picture associated with the RPLM command is equal to a frame number associated with the current picture.

28. The video encoding device of claim 27, wherein the synthetic reference picture is a view-synthesis reference picture (VSRP).

29. The video encoding device of claim 27, wherein the RPLM command comprises a syntax element that has a value, wherein a picture number associated with the RPLM command is equal to a picture number prediction value plus or minus the value, plus 1, and the frame number of the reference picture associated with the RPLM command is determinable based on the picture number of the current picture.

30. The video encoding device of claim 27, wherein the RPLM command includes an RPLM type identifier equal to 0 or 1.

31. A video encoding device comprising:
  means for generating, based at least in part on one or more view components, a synthetic reference picture;
  means for using the synthetic reference picture as a reference picture to encode one or more video blocks of a current picture of video data; and
  means for generating a bitstream that includes a reference picture list modification (RPLM) command that is a short-term reference picture RPLM command, the RPLM command instructing a video decoder to insert the synthetic reference picture at a particular location in a reference picture list, wherein a frame number of a reference picture associated with the RPLM command is equal to a frame number associated with the current picture.

32. The video encoding device of claim 31, wherein the synthetic reference picture is a view-synthesis reference picture (VSRP).

33. The video encoding device of claim 31, wherein the RPLM command comprises a syntax element that has a value, wherein a picture number associated with the RPLM command is equal to a picture number prediction value plus or minus the value, plus 1, and the frame number of the reference picture associated with the RPLM command is determinable based on the picture number of the current picture.

34. The video encoding device of claim 31, wherein the RPLM command includes an RPLM type identifier equal to 0 or 1.

35. A non-transitory computer-readable storage medium having stored thereon instructions that, when executed by one or more processors of a video encoding device, configure the video encoding device to:

generate, based at least in part on one or more view components, a synthetic reference picture;

use the synthetic reference picture as a reference picture to encode one or more video blocks of a current picture of video data; and generate a bitstream that includes a reference picture list modification (RPLM) command that is a short-term reference picture RPLM command, the RPLM command instructing a video decoder to insert the synthetic reference picture at a particular location in a reference picture list, wherein a frame number of a reference picture associated with the RPLM command is equal to a frame number associated with the current picture.

36. The non-transitory computer-readable storage medium of claim 35, wherein the synthetic reference picture is a view-synthesis reference picture (VSRP).

37. The non-transitory computer-readable storage medium of claim 35, wherein the RPLM command comprises a syntax element that has a value, wherein a picture number associated with the RPLM command is equal to a picture number prediction value plus or minus the value, plus 1, and the frame number of the reference picture associated with the RPLM command is determinable based on the picture number of the current picture.

38. The non-transitory computer-readable storage medium of claim 35, wherein the RPLM command includes an RPLM type identifier equal to 0 or 1.

* * * * *